US007370957B2

(12) United States Patent
Yamashita et al.

(10) Patent No.: US 7,370,957 B2
(45) Date of Patent: May 13, 2008

(54) INK JET RECORDING APPARATUS

(75) Inventors: Yoshiro Yamashita, Ebina (JP); Ken Hashimoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 364 days.

(21) Appl. No.: 11/052,492

(22) Filed: Feb. 4, 2005

(65) Prior Publication Data

US 2006/0055757 A1 Mar. 16, 2006

(30) Foreign Application Priority Data

Sep. 14, 2004 (JP) ............................ 2004-267311

(51) Int. Cl.
*C09D 11/00* (2006.01)

(52) U.S. Cl. .......................... 347/102; 347/34; 347/86; 347/100; 347/105; 399/93

(58) Field of Classification Search .................. 399/93; 347/34

See application file for complete search history.

(56) References Cited

U.S. PATENT DOCUMENTS

| | | | | |
|---|---|---|---|---|
| 5,471,280 | A * | 11/1995 | Taguchi | 399/330 |
| 6,275,670 | B1 * | 8/2001 | Cho et al. | 399/92 |
| 6,390,618 | B1 * | 5/2002 | Wotton et al. | 347/102 |
| 6,397,488 | B1 * | 6/2002 | Brinkly | 34/92 |
| 6,463,674 | B1 * | 10/2002 | Meyers et al. | 34/304 |
| 6,535,703 | B2 * | 3/2003 | Yamamoto et al. | 399/93 |
| 6,730,714 | B2 * | 5/2004 | Ylitalo et al. | 522/74 |
| 6,775,492 | B2 * | 8/2004 | Miyakoshi et al. | 399/92 |
| 6,905,203 | B2 * | 6/2005 | Kremers et al. | 347/103 |
| 7,027,752 | B2 * | 4/2006 | Yon et al. | 399/93 |
| 2003/0026585 | A1 * | 2/2003 | Iimura | 385/144 |
| 2003/0063172 | A1 * | 4/2003 | Ohtsu et al. | 347/102 |
| 2003/0179260 | A1 * | 9/2003 | Anderson et al. | 347/25 |
| 2004/0037582 | A1 * | 2/2004 | Shin | 399/93 |
| 2004/0047646 | A1 | 3/2004 | Yon et al. | 399/93 |
| 2004/0104963 | A1 * | 6/2004 | Nakazawa | 347/34 |
| 2004/0189743 | A1 * | 9/2004 | Droege et al. | 347/34 |
| 2004/0189773 | A1 * | 9/2004 | Masumi et al. | 347/102 |
| 2004/0223041 | A1 * | 11/2004 | Ishikawa | 347/105 |
| 2004/0227798 | A1 * | 11/2004 | Nakajima | 347/100 |
| 2006/0056874 | A1 * | 3/2006 | Kim et al. | 399/93 |
| 2006/0088332 | A1 * | 4/2006 | Brenner et al. | 399/93 |
| 2006/0090996 | A1 * | 5/2006 | Yaniv et al. | 204/157.15 |
| 2006/0093392 | A1 * | 5/2006 | Baker et al. | 399/93 |

FOREIGN PATENT DOCUMENTS

| | | |
|---|---|---|
| EP | 1442892 | 8/2004 |
| JP | 08-332384 | 12/1996 |
| JP | 2000-140087 | 5/2000 |
| JP | 2002276999 A * | 9/2002 |
| JP | 2003-112412 | 4/2003 |
| JP | 2004-240270 | 8/2004 |

* cited by examiner

*Primary Examiner*—Matthew Luu
*Assistant Examiner*—John P Zimmermann
(74) *Attorney, Agent, or Firm*—Fildes & Outland, P.C.

(57) ABSTRACT

An ink jet recording apparatus which includes a recording head, and forms an image by ejecting printing liquid including a volatile organic compound (VOC) from the recording head onto a recording medium, wherein the ink jet recording apparatus includes a volatile organic compound decomposer for decomposing the volatile organic compound.

15 Claims, 2 Drawing Sheets

INK JET RECORDING APPARATUS

CROSS-REFERENCE TO RELATED APPLICATION

This application claims priority under 35 USC 119 from Japanese Patent Application No. 2004-267311, the disclosure of which is incorporated by reference herein.

BACKGROUND OF THE INVENTION

1. Field of the Invention

The present invention relates to an ink jet recording apparatus which forms an image by using printing liquid such as ink.

2. Description of the Related Art

In recent years, there has been a call for reduced usage of various volatile organic compounds (VOC: Volatile Organic Compound) discharged from ink jet type copy machines or electrophotographic copy machines/printers/complex machines used in offices in order to reduce the environmental load.

Further, in order to define the achievement standard in meeting such requirements, there are cases in which public third-party organizations or a companies manufacturing such products have set specific standard (Eco Label Certification Standard) for regulating TVOC (Total Volatile Organic Compounds).

On the other hand, printing liquid (ink or treatment liquid and the like for accelerating flocculation of a colorant in ink) used in an ink jet recording apparatus includes various VOC components such as a water-soluble organic solvent and the like. Therefore, from now on, not only will it become important to suppress the amount of VOCs generated from the ink jet recording apparatus, but also to meet the above-mentioned standard.

Further, higher speed and higher image quality are required of the ink jet recording apparatus. In order to realize higher speed, improvement in printing speed, that is, increase in the ejection amount of printing liquid ejected from the recording head per unit of time is required. Moreover, in order to realize higher image quality, it is necessary to further reduce the size of a liquid droplet of the printing liquid ejected from the recording head.

Therefore, it is inevitable that the amount of VOCs generated from the ink jet recording apparatus per unit of time increases along with faster speed and higher image quality, which contradicts the above trend of suppressing VOC generation.

On the other hand, regarding the VOCs generated from the ink jet recording apparatus, since the above-mentioned need for reducing VOCs has become marked only in recent years, not much concrete investigation has been conducted as yet.

As an example, since there is a case where ink used in the ink jet recording apparatus includes a component having volatile odor, an ink jet recording apparatus (refer to JP-A-2003-112412) including a means for deodorizing or reducing this volatile odor has been proposed.

However, the above-mentioned ink jet recording apparatus uses an activated carbon or an aromatic substance in order to deodorize or reduce the volatile odor. Therefore, in a case where activated carbon is used, once the VOCs that have volatilized from the printing liquid have been adsorbed to the activated carbon to some degree, the adsorption capacity of the activated carbon becomes saturated, so that the outflow of VOCs from the apparatus cannot be suppressed. In a case where the adsorption capacity diminishes, exchange of the activated carbon is required. Furthermore, in a case where the activated carbon is left to stand under an environment of high temperature, there is a possibility that the VOC component adsorbed once may be discharged again. In a case where an aromatic substance is used, this merely deceives the sense of smell, and the VOC component itself is not removed from the room in which the ink jet recording apparatus is set.

SUMMARY OF THE INVENTION

The present invention has been made in view of the above circumstances. The invention provides an ink jet recording apparatus which can decompose VOC (Volatile Organic Compound) component generated along with image formation, and can thereby suppress the volatile organic compound concentration in a space where the ink jet recording apparatus is set.

A first aspect of the invention is to provide an ink jet recording apparatus which comprises a recording head, and forms an image by ejecting printing liquid including a volatile organic compound (VOC) from the recording head onto a recording medium, wherein the ink jet recording apparatus comprises a volatile organic compound decomposer for decomposing the volatile organic compound.

DETAILED DESCRIPTION OF THE INVENTION

Figure 1:
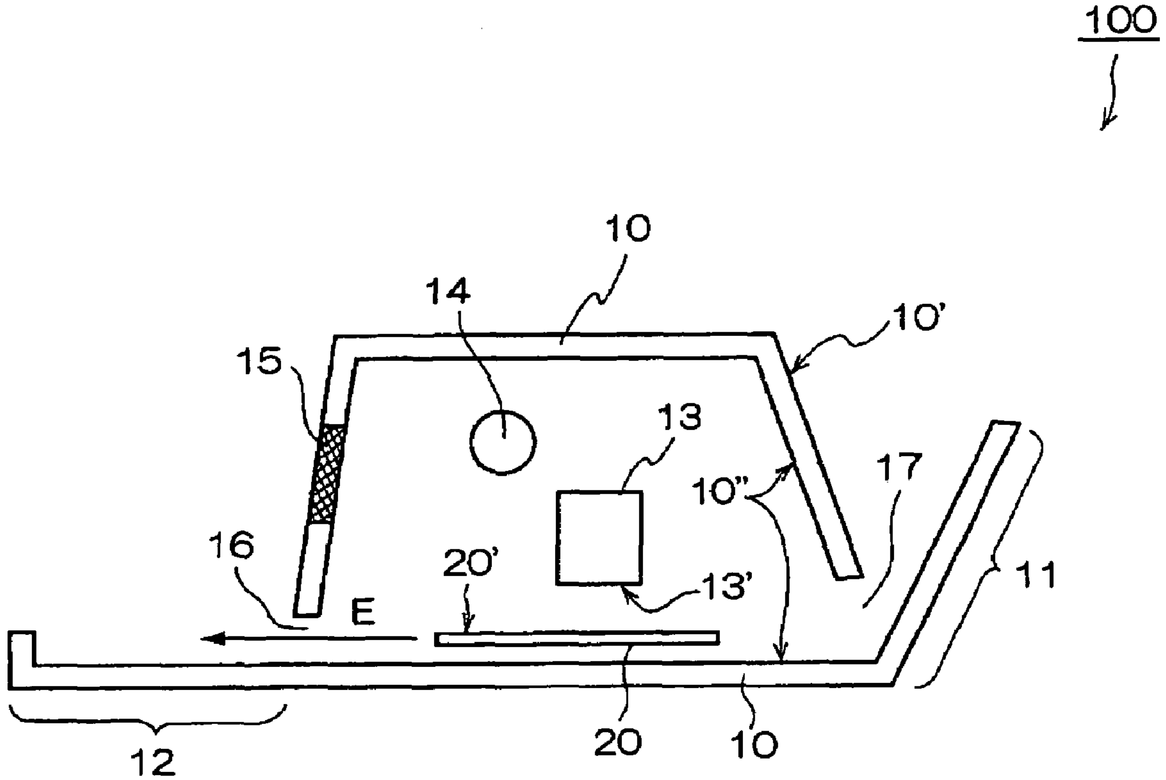
FIG. 1 is a schematic diagram showing an example of an ink jet recording apparatus of the invention.

An ink jet recording apparatus of the invention, which includes a recording head, and forms an image by ejecting printing liquid including a volatile organic compound (hereinafter, also referred to as "VOC") from the recording head onto a recording medium, is characterized by including a volatile organic compound decomposer that decomposes the volatile organic compound.

Therefore, since the ink jet recording apparatus of the invention can decompose the VOC component generated with image formation, the concentration of the volatile organic compounds in a space (room) where the ink jet recording apparatus is set can be suppressed.

In the invention, the volatile organic compound (VOC) means any organic compound having volatility except water, which is included in printing liquid such as ink including a colorant, and colorless or light-colored liquid (treatment liquid) including a component that flocculates the colorant in this ink. Specifically, the VOC means a volatile organic compound in which vapor pressure at 20° C. is $1.33\times10^{-7}$ kPa ($1\times10^{-6}$ mmHg) or more.

On the other hand, as the volatile organic compound decomposer, it is particularly preferable to use a catalyst. However, the invention is not limited to this. For example, besides using the catalyst, known volatile organic compound decomposers can be used, for example, a discharger for decomposing the volatile organic compounds by the use of corona discharge, a bio-type decomposer using a microorganism, an ozone oxidation, and a combustion device. These can be used in combination of two or more kinds.

Here, the catalyst used in the invention means a catalyst which has a function of decomposing the volatile organic compound into components (mainly water and carbon dioxide) which have lower molecular weight and are inactive in a case where the volatile organic compounds come into contact with the activated catalyst.

As the catalyst, a catalyst (photocatalyst) which is activated by radiating light is particularly preferable, a representative being titanium dioxide ($TiO_2$). In addition, as long as the catalyst is activated by applying any physical, chemical, or mechanical energy from the outside, such as a catalyst activated by applying heat, any catalyst can be used without limitations.

Further, the catalyst used in the invention may have the capacity to decompose at least only a partial component (the partial component means a component that can be classified according to molecular structure, or other features, for example, according to molecular weight or vapor pressure) of all the volatile organic compound components included in the printing liquid, and the catalyst preferably has the capacity to decompose as many components as possible. However, depending on the kind of catalyst, the component in which the decomposition capacity can be effectively exhibited is different. Therefore, two or more kinds of catalysts may be used as necessary. In this case, the volatile organic compounds can be decomposed more efficiently.

In the invention, as preferable volatile organic compound components to be decomposed, from the viewpoint of vapor pressure, components having vapor pressure at 20° C. of $1.33\times10^{-5}$ kPa ($1\times10^{-4}$ mmHg) to 40 kPa ($3\times10^{-2}$ mmHg) are preferable, and components having vapor pressure at 20° C. of $1.33\times10^{-4}$ kPa ($1\times10^{-3}$ mmHg) to 6.67 kPa (50 mmHg) are more preferable. The volatile organic compounds showing vapor pressure in the above ranges are included in the printing liquid in comparatively large amounts, and are the major causes of increasing volatile organic compound concentration in air.

Photocatalyst

Next, a case where the photocatalyst of which representation is a $TiO_2$ series is used as the volatile organic compound decomposer will be described in detail.

As the photocatalysts, either of a type (visible light-responsive photocatalyst) activated application of visible light (wavelength: about 360 nm to 830 nm) or a type (ultraviolet light-responsive photocatalyst) activated by application of ultraviolet light (wavelength: about 1 nm to 360 nm) may be used, or these two types may be used together.

Examples of the visible light-responsive photocatalysts include nitrogen-doped titanium dioxide, carbon-doped titanium dioxide, sulfur-doped titanium dioxide, fluorine-doped titanium dioxide, halogenated platinic acid supported-type titanium dioxide, brookite type titanium dioxide, and indium tantalate.

Further, examples of the ultraviolet light-responsive photocatalysts include anatase type titanium dioxide, zinc oxide, tin oxide, niobium oxide, and strontium titanate.

On the other hand, in a case where the photocatalyst is utilized, in order to facilitate its handling or improve contact efficiency with the volatile organic compounds, it is preferable that the photocatalyst is supported by a support such as an adsorbent or a metal thereby to be used. Further, by mixing the photocatalyst with a resin or another organic material, the photocatalyst can be readily handled as a member.

Here, examples of the adsorbent include activated carbon, zeolite, silica, alumina, potassium permanganate, and molecular sieve.

Further, examples of the metal material include platinum. As the resin and other organic materials, known materials can be used, for example, fluorocarbon resin, paper/pulp, and other chemical fibers. In a case where the photocatalyst is directly brought into contact with the resin material, occasionally, the part of the resin material that comes into contact with the photocatalyst may be decomposed/corroded by the catalyst action. Therefore, it is preferable that the photocatalyst is supported, via an inorganic material (which does not cause decomposition or corrosion in the resin material), by the resin material.

Examples of the inorganic material include inert ceramics such as apatite.

Light Source

Next, a light source for activating the photocatalyst will be described.

In a case where the ink jet recording apparatus of the invention uses the photocatalyst as the catalyst for decomposing the volatile organic compounds, it may have a photocatalyst activating light source. In this case, especially when the photocatalyst is set in a position where the photocatalyst is not exposed to a light source (light source such as a fluorescent lamp in a room, or sunlight) located outside the apparatus, it can be activated sufficiently.

As the photocatalyst activating light source, according to the kind of photocatalyst used, a photocatalyst activating light source which can radiate light in a wavelength region suitable for activation can be used, and a special light source for activating the photocatalyst may be utilized.

On the other hand, in a case where the printing liquid includes a light-curable component (for example, photopolymerizable compounds, which will be described later in detail) that is cured by application of light, an ink curing light source which irradiates a surface of a recording medium onto which the printing liquid is applied with light for curing the light-curable component is arranged in the ink jet recording apparatus.

In such a case, this ink curing light source can be used as the photocatalyst activating light source. The photocatalyst activated by the wavelength of the light radiated from the ink curing light source is arranged in a position where the light of this light source strikes the photocatalyst.

As the photocatalyst activating light source used for the ultraviolet light-responsive photocatalyst, a known ultraviolet light source may be used without any particular restriction. However, it is preferable to use a black light or an ultraviolet ray emitting diode that are generally utilized as the ink curing light source.

Further, in a case where the used photocatalyst is a visible light-responsive photocatalyst, it is preferable that a light source outside the apparatus is utilized. In this case, it is not necessary to provide the photocatalyst activating light source for the ink jet recording apparatus.

As long as the above-described photocatalyst (or the photocatalyst support) is put in a position where the photocatalyst is exposed to the light source which can activate this photocatalyst, it can be arranged in a desired position inside or outside the ink jet recording apparatus.

For example, in a case where the ink jet recording apparatus has a housing and a ventilation opening from which the inside of the housing is ventilated, and the ventilation opening has a filter, it is preferable that this filter is coated with the photocatalyst. In this case, when the volatile organic compounds produced in the ink jet recording apparatus are discharged through the ventilation opening to the outside of the apparatus, they react with the photocatalyst and are decomposed.

Further, in a case where the ink jet recording apparatus has a housing provided with a paper outlet from which a recording medium is discharged, and a paper discharge tray on which the recording medium discharged from this paper discharging opening is stored, it is preferable that an outer surface of the housing and/or a surface of the discharge tray is coated with the photocatalyst.

In this case, the volatile organic compounds generated in the ink jet recording apparatus and discharged to the outside of the apparatus, and the volatile organic compounds generated outside the ink jet recording apparatus such as the volatile organic compounds generated from the recording medium that have been discharged on the paper discharge tray after image formation can be decomposed by the photocatalyst.

In either of the above types, conventional members used for constituting the general ink jet recording apparatus are utilized. However, in order to decompose the volatile organic compounds more efficiently, a special member for decomposing the volatile organic compounds may be provided.

For example, in a case where the ink jet recording apparatus has a housing provided with the paper outlet from which the recording medium is discharged, and the discharge tray on which the recording medium discharged from this paper discharging opening is stored, it is preferable that between this housing and the paper discharge tray, a transparent housing having one opening connected to the paper outlet and the other opening connected to the paper discharge tray is provided, and the inner surface of this transparent housing is coated with the photocatalyst.

On the other hand, in a case where an image is formed by ink jet recording, immediately after the printing liquid is ejected from the recording head onto the recording medium, until the time the recording medium moves to the paper discharge tray, the printing liquid on the recording medium dries (namely, the amount of the volatile organic compounds volatilizing in air per unit of time is highest). Moreover, the air including the volatile organic compounds that have volatilized in the housing flows to the outside of the apparatus through the paper outlet with discharge of the recording medium. Therefore, the air including the volatile organic compounds at a high concentration easily remains inside the above-mentioned housing.

However, since this housing is transparent with its inner surface coated with the photocatalyst, light from light sources outside the apparatus such as a fluorescent lamp outside the apparatus and sunlight can stream into the inner surface of the transparent housing, thus activating the photocatalyst. Therefore, the air including the volatile organic compounds at a high concentration, which stays inside of the housing, comes into contact with the housing inner surface, whereby the volatile organic compounds are efficiently decomposed.

Regarding the housing used in the invention, it is not necessary that all of the housing walls are transparent. As long as the light of the light source outside the apparatus sufficiently strikes the region in which the photocatalyst on the housing inner surface is provided, a part of the housing walls may be opaque. For example, in a case where the ink jet recording apparatus is set on a stand, since the light of the light source outside apparatus does not stream into the housing from the bottom surface side, the bottom surface may be opaque.

Specific Example of Ink Jet Recording Apparatus

Next, specific examples of the ink jet recording apparatus of the invention will be described with reference to drawings.

FIG. 1 is a schematic diagram showing an example of the ink jet recording apparatus of the invention, and shows a section of the inside of the apparatus in a case where the inside of the ink jet recording apparatus is seen from a side surface direction (direction orthogonal to a recording medium conveying direction). Main parts in the apparatus are shown in FIG. 1, and other components are omitted.

In FIG. 1, reference numeral 10 is a housing, 10' is a housing outer surface, 10" is a housing inner surface, 11 is a paper supply tray, 12 is a paper discharge tray, 13 is a recording head, 13' is a nozzle surface, 14 is an ink curing light source (used also as a photocatalyst activating light source), 15 is a ventilation opening having a filter, 16 is a paper outlet, 17 is a paper inlet, 20 is a recording medium, 20' is a printing surface, 100 is an ink jet recording apparatus, and an arrow E means a conveying direction (paper discharge passage) of the recording medium 20.

The ink jet recording apparatus 100 shown in FIG. 1 comprises the housing 10 formed substantially in the shape of a trapezoid, the recording head 13 and the ink curing light source 14 which are arranged in the housing 10, the paper discharge tray 12 externally attached to the paper outlet 16 provided at the bottom of the housing 10 on the downstream side in the conveying direction of the recording medium 20 conveyed in one direction in the housing 10, the paper supply tray 11 externally attached to the paper inlet 17 provided at the bottom of the housing 10 on the upstream side in the conveying direction of the recording medium 20, and the ventilation opening 15 provided for a part of a wall surface (wall surface on the downstream side in the transporting direction of the recording medium 20) of the housing 10.

Here, in printing, the recording medium 20 is conveyed by a not-shown conveyor in the direction of an arrow E, that is, from the paper supply trays 11 through the bottom side in the housing 10 to the paper discharge tray 12. Further, the recording head 13 and the ink curing light source 14 are arranged on the upside (printing surface 20' side) of the recording medium 20 conveyed on the bottom side in the housing 10, the recording head 13 is arranged on the upstream side in the conveying direction of the recording medium 20, and the ink curing light source 14 is arranged on the downstream side. Here, the recording head 13 is arranged so that the nozzle surface 13' faces the downside (the side on which the recording medium 20 is conveyed).

The recording head 13 may be a so-called scan-type recording head that can scan in the paper width direction (in the direction orthogonal to the arrow E) of the recording medium 20, or a so-called fixed type recording head having substantially the same width as the paper width (in the direction orthogonal to the arrow E) of the recording medium 20.

Further, the ink curing light source 14 is a cylindrical light source that radiates an ultraviolet ray such as black light. Since the light source 14 can radiate the light radially from the whole of its peripheral surface, it can radiate the light not only on the printing surface 20' of the recording medium 20 that has received the printing liquid from the recording head

13, but also on the surface on the housing inner side of the filter provided for the ventilation opening 15, and on the inner wall of the housing 10.

In this ink jet recording apparatus 100, image formation is executed as follows: Firstly, when the recording medium 20 supplied from the paper supply tray 11 into the housing 10 is conveyed in the nozzle surface 13' side of the recording head 13 in the direction of the arrow E by the not-shown paper conveyor, the printing liquid (ink and treatment liquid) including the light curable components is ejected from the nozzle surface 13' onto the printing surface 20' (surface on the nozzle surface 13' side) of the recording medium 20.

Sequentially, the printing surface 20' of the recording medium 20 further conveyed to the downstream side is irradiated with the ultraviolet beams from the ink curing light source 14, and the light curable components in the printing liquid applied on the printing surface 20' are cured. Thereafter, the recording medium 20 is discharged onto the paper discharge tray 12 outside the housing 10.

In such a sequence of image formation, immediately after the printing liquid has been applied onto the printing surface 20' of the recording medium 20, volatilization of volatile organic compound components included in the printing liquid starts, and volatilization of the volatile organic compound components from the printing surface 20' of the recording medium 20 that have been discharged to the paper discharge tray 12 also continues for a while.

Therefore, in the image formation, by the volatile organic compounds volatilizing from the printing surface 20' of the recording medium 20 immediately after printing, the concentration of the volatile organic compounds in the housing 10 increases remarkably. In addition to this, also outside the housing 10, by the volatile organic compounds volatilizing from the printing surface 20' of the recording medium 20 on the paper discharge tray 12, and air that is high in concentration of the volatile organic compounds discharged through the ventilation opening 15 to the outside of the housing 10, the concentration of the volatile organic compounds increases.

Therefore, in order to decompose the volatile organic compounds in the housing 10, it is preferable that the inner surface on the housing 10 side of the filter of the ventilation opening 15 is coated with the ultraviolet responsive photocatalyst which can be activated by the light radiated from the ink curing light source 14. In this case, when the air in the housing 10, including the volatile organic compounds of the high concentration is discharged through the ventilation opening 15 to the outside of the housing 10, the volatile organic compounds can be efficiently decomposed.

Further, it is preferable that the outer surface of the housing 10 of the filter of the ventilation opening 15 is coated with the photocatalyst. In this case, when the air in the housing 10, including the volatile organic compounds of the high concentration is discharged through the ventilation opening 15 to the outside of the housing 10, the volatile organic compounds can be efficiently decomposed by using light radiated from the light sources (not shown) outside the apparatus such as the fluorescent lamp and the sunlight.

Alternatively, the inner wall surface 10" of the housing 10, the recording head 13, or the surfaces of other members (not shown) arranged in the housing 10 may be coated with the ultraviolet responsive photocatalyst, as long as they are located in positions which the light radiated from the ink curing light source 14 strikes. By the ultraviolet responsive photocatalyst coating on the surfaces of these members, the volatile organic compounds included in the air staying in the housing 10 can be decomposed gradually.

On the other hand, in order to decompose the volatile organic compounds outside the housing 10, it is preferable that the surface of the paper discharge tray 12 and the outer wall surface 10' of the housing 10 are coated with the photocatalyst.

By coating the surface of the paper discharge tray 12 with the photocatalyst, particularly, the volatile organic compounds volatilizing from the printing surface 20' of the recording medium 20 discharged onto the paper discharge tray 12, and the volatile organic compounds included in the air that flows from the inside of the housing 10 through the opening 16 to the outside of the housing 10 can be efficiently decomposed. In addition, the volatile organic compounds included in the air staying outside the housing 10 can be decomposed gradually.

Further, by coating the outer wall surface 10' of the housing 10 with the photocatalyst, volatile organic compounds included in the air staying outside the housing 10 can be decomposed gradually.

Since the out-apparatus light source can be utilized for activation of the photocatalyst coating the outside of the housing 10, the visible light responsive photocatalyst and/or the ultraviolet light responsible photocatalyst can be used. However, in a case where the light radiated from the out-apparatus light source does not include light in an ultraviolet region, or in a case where an intensity thereof is weak, it is preferable that the visible light responsive photocatalyst is used.

Next, another example of the ink jet recording apparatus of the invention will be described.

Figure 2:
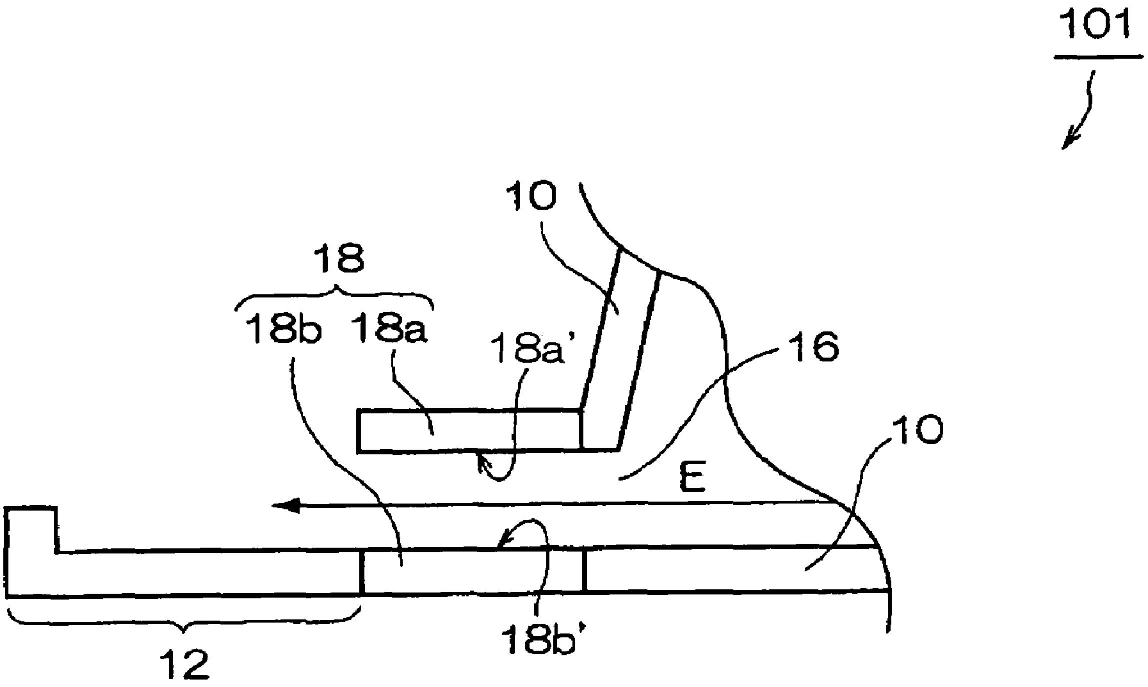
FIG. 2 is a schematic diagram showing another example of the ink jet recording apparatus of the invention.

FIG. 2 is a schematic diagram showing another example of the ink jet recording apparatus of the invention, and shows a section of the circumference of the paper discharge tray of the ink jet recording apparatus in a case where the inside of the ink jet recording apparatus is seen from the side surface direction (direction orthogonal to the recording medium conveying direction.

In FIG. 2, reference numeral 18 is a housing, 18*a* is a housing upper wall, and 18*a'* is an inner surface of the housing upper wall, 18*b* is a housing bottom wall, 18*b'* is an inner surface of the housing bottom wall, 101 is an ink jet recording apparatus, and other reference numerals are the same as those shown in FIG. 1.

Although the basic structure of the ink jet recording apparatus 101 shown in FIG. 2 is similar to that of the ink jet recording apparatus 100 shown in FIG. 1, the ink jet recording apparatus 101 is characterized in that the housing 18 having one opening connected to the paper outlet 16 and the other opening connected to the paper discharge tray 12 is provided.

In this housing 18, the housing upper wall 18*a* and a housing side wall (not shown) are composed of a transparent material, and the housing bottom wall 18*b* is composed of an opaque material. Therefore, the housing upper wall 18*a* and the housing side wall transmit light radiated from an out-apparatus light source (not shown), and the light is radiated on a transparent housing inner surface (the inner surface 18*a'* of the transparent housing upper wall, the inner surface (not shown) of the transparent housing side wall, and the inner surface 18*b'* of the transparent housing bottom wall). Therefore, in a case where the transparent housing inner surfaces are coated with the photocatalyst, this photocatalyst is activated by the out-apparatus light source (not shown).

Therefore, volatile organic compounds included in the air that flow from the inside of the housing 10 to the outside of the apparatus, and volatile organic compounds volatilizing when the recording medium 20 immediately after printing passes through the inside of the transparent housing 18 can be efficiently decomposed by the photocatalyst coating the inside of the transparent housing 18.

Other Apparatus Specifications/Structure

Next, other specifications and constitution of the ink jet recording apparatus of the invention will be described. It is preferable that the ink jet recording apparatus of the invention can realize high speed and high image quality.

Namely, from the viewpoint of faster speed, it is preferable that the maximum image forming speed is 10 sheets/min. or more in a case where a recording medium is of A4 size (210×297 mm), and it is more preferable that the speed is 100 sheets/min or more. The higher the maximum image forming speed, the better it is.

In addition, in a case where image formation by the ink jet recording apparatus of the invention is performed, in a state where the recording head is fixed, by conveying the recording medium in one direction so that the recording medium faces the surface of the recording head on the side from which the printing liquid is ejected, it is preferable that the width of the recording medium in the direction orthogonal to the conveying direction of the recording medium is substantially the same as the width of the recording head in the direction orthogonal to the conveying direction of the recording medium (adoption of a so-called fixed type recording head).

Further, from the viewpoint of realizing higher image quality, it is preferable that the quantity (drop quantity) of a liquid droplet ejected from the recording head is 120 pl or less, and more preferable that the drop quantity is 5 pl or less. The smaller the drop quantity, the more preferable it is. However, from a practical standpoint, it is preferable that the drop quantity is 1 pl or more.

However, any of increase of the maximum image forming speed, adoption of the fixed type recording head, and size reduction of the liquid droplet cause increased quantity of volatile organic compounds volatilizing per unit of time. However, in the ink jet recording apparatus of the invention, since the volatile organic compound decomposer using the above-mentioned photocatalyst is provided, a large quantity of the volatile organic compound can be efficiently decomposed, so that also in a case where the image formation is continuously executed, it is possible to suppress the increase in concentration of the volatile organic compounds in a space such as a room where the ink jet recording apparatus is set.

Printing Liquid

As the printing liquid used in the ink jet recording apparatus of the invention, in addition to ink including a colorant such as a pigment and a dye, colorless or light-colored liquid (treatment liquid) for accelerating flocculation of the colorant in this ink, which does not include the colorant, can also be used as necessary.

For such printing liquid, in addition to water and a colorant (in case of ink), a water soluble organic solvent may be included, and further various additives can also be added as necessary. For example, in order to accelerate the flocculation of the colorant, a polyvalent metal salt that reacts with this colorant and flocculates may be utilized.

Besides the above, in order to accelerate curing of ink by radiating the light to the printing liquid, a photopolymerizable compound may be added to the ink, or a photopolymerization initiator may be added to the ink and/or the treatment liquid.

Next, various components included in the printing liquid, that is, the photopolymerizable compound, the photopolymerization initiator, the polyvalent metallic ion, the colorant, and other components will be described below.

Photopolymerizable Compound

As examples of the photopolymerizable compound, there are known photopolymerizable compounds, for example, an epoxy (meta-) acrylate series, a polyester (meta-) acrylate series, a polycarbonate (meta-) acrylate series, a polyurethane (meta-) acrylate series, a polyetherpolyol (meta-) acrylate series, a polybutadiene (meta-) acrylate series, a silicon (meta-) acrylate series, a melamine (meta-) acrylate series, a monofunctional (meta-) acrylate series, a multi-functional (meta-) acrylate series, (meta-) acrylamide, a 1,2-disubstituted ethylene compound, a vinyl ether series, α-methyl styrene, divinylbenzene, a vinylmonomer carboxylate series, and a vinylmonomer having a cyano group and a nitrogen atom such as acrylonitrile.

Photopolymerization Initiator

As examples of the photopolymerization initiator, there are known photopolymerization initiators, for example, compounds of a benzoin ether series, an acetophenone series, a benzophenone series, a thioxanthone series, and an acylphosphine oxide series. Specifically, there are compounds such as benzoin isopropyl ether, 1,1-dichloroacetophenone, 4 4'-dichlorobenzophenone, 3,3',4,4'-tetra(t-butylperoxycarbonyl)benzophenone, 2-chlorothioxanthone, and bis(2,4,6-trimethylbenzoyl) phenylphosphine oxide.

Polyvalent Metallic Ion

In a case where two or more kinds of printing liquid are used, polyvalent metallic ion is added to at least one kind of printing liquid, and the colorant which reacts with this polyvalent metallic ion and flocculates is added to other printing liquid, whereby intercolor bleeding can be prevented. Any known divalent or higher polyvalent metallic ion can be used without particular limitation. Examples of the polyvalent metallic ion include Mg, Ca, Ba, Cu, Co, Ni, Zn, Fe, Al, Ti, La, Nd, Y, Pr, Sm, Sb, and In. The polyvalent metallic ion can be added to the printing liquid as a salt compound.

Examples of such salt compound include phosphate, sulfate, nitrate, and acetate. In order to suppress precipitation in the printing liquid, it is preferable that solubility of the salt compound exceeds 10. In a case where the solubility is 10 or less, there is a possibility that a nozzle of a recording head may be clogged or long-term stability of ink may deteriorate.

As the polyvalent metallic ion, of the above examples, Mg is particularly preferable. Since secondary trouble such as clogging at the nozzle of the recording head is less likely to occur compared to other metallic ions, more stable printing can be performed.

Further, it is preferable that the concentration of the polyvalent metallic ion in the printing liquid is 100 ppm or more, and more preferably 500 ppm or more. In a case where the concentration of the polyvalent metallic ion in the printing liquid is smaller than 100 ppm, there is a possibility that adequate effect of water resistance and improvement in intercolor bleeding by using the metallic ion may not be obtained, or image density may become lower.

Colorant

In a case where the printing liquid is used as ink, a known colorant (pigment, dye) is added to the printing liquid. As the colorant added to the printing liquid, it is preferable that a self-disperse pigment or a pigment used together with a polymer dispersant is utilized.

As the dye, either of a water-soluble dye and a disperse dye can be used. Specific examples of the water-soluble dye include C. I. Direct Black −2, −4, −9, −11, −17, −19, −22, −32, −80, −151, −154, −168, −171, −194, −195; C. I. Direct Blue −1, −2, −6, −8, −22, −34, −70, −71, −76, −78, −86, −112, −142, −165, −199, −200, −201, −202, −203, −207, −218, −236, −287, and −307; C. I. Direct Red −1, −2, −4, −8, −9, −11, −13, −15, −20, −28, −31, −33, −37, −39, −51, −59, −62, −63, −73, −75, −80, −81, −83, −87, −90, −94, −95, −99, −101, −110, −189, and −227; C I. Direct Yellow −1, −2, −4, −8, −11, −12, −26, −27, −28, −33, −34, −41, −44, −48, −58, −86, −87, −88, −132, −135, −142, −144, and −173; C. I. Food Black −1, and −2; C. I. Acid Black −1, −2, −7, −16, −24, −26, −28, −31, −48, −52, −63, 107, −112, −118, −119, −121, −156, −172, −194, and −208; C. I. Acid Blue −1, −7, −9, −15, −22, −23, −27, −29, −40, −43, −55, −59, −62, −78, −80, −81, −83, −90, −102, −104, −111, −185, −249, and −254; C. I. Acid Red −1, −4, −8, −13, −14, −15, −18, −21, −26, −35, −37, −52, −110, −144, −180, −249, −257, and −289; and C. I. Acid Yellow −1, −3, −4, −7, −11, −12, −13, −14, −18, −19, −23, −25, −34, −38, −41, −42, −44, −53, −55, −61, −71, −76, −78, −79, and −122.

Specific examples of the disperse dye include C. I. Disperse Yellow −3, −5, −7, −8, −42, −54, −64, −79, −82, −83, −93, −100, −119, −122, −126, −160, and −184:1, −186, −198, −204, and −224; C. I. Disperse Orange −13, −29, −31:1, −33, −49, −54, −66, −73, −119, and −163; C. I. Disperse Red −1, −4, −11, −17, −19, −54, −60, −72, −73, −86, −92, −93, −126, −127, −135, −145, −154, −164, −167:1, −177, −181, −207, −239, −240, −258, −278, −283, −311, −343, −348, −356, and −362; C. I. Disperse Violet −33; C. I. Disperse Blue −14, −26, −56, −60, −73, −87, −128, −143, −154, −165, −165:1, −176, −183, −185, −201, −214, −224, −257, −287, −354, −365, and −368; and C. I. Disperse Green −6:1, and −9.

Further, a pigment can be also used. Specific examples of a black pigment include RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, and RAVEN 1060 (manufactured by Columbian Carbon Chemicals Company); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300, and MONARCH 1400 (manufactured by Cabot Corporation); Color Black FW 1, Color Black FW2, Color Black FW2V, Color Black 18, Color Black FW 200, Color Black S150, Color Black S160, Color Black S170, PRINTEX 35, PRINTEX U, PRINTEX V, PRINTEX 140U, PRINTEX 140V, Special Black 6, Special Black 5, Special Black 4A, and Special Black 4 (manufactured by Degussa Corporation); and No. 25, No. 33, No. 40, No. 47, No. 52, No. 900, No. 2300, MCF-88, MA 600, MA 7, MA 8, and MA 100 (manufactured by Mitsubishi Chemical Corporation.). However, the black pigment is not limited to these examples.

Further, as the self-disperse pigment (pigment that can disperse itself in water), in addition to pigments obtained by applying surface treatment to the above pigments, commercially available self-disperse pigments can also be used, for example, CAB-O-JET-200, CAB-O-JET-300, IJX-253, IJX-266, IJX-444, IJX-273, and IJX-55 (manufactured by Cabot Corporation); Microjet Black CW-1, CW-2 (manufactured by Orient Chemical Industries, Ltd.); and self-disperse pigments by Nippon Shokubai Co., Ltd.

As examples of a pigment of cyan ink, there are C. I. Pigment Blue −1, −2, −3, −15, −15:1, −15:2, −15:3, −15:4, −16, −22, −60 and the like. However, the cyan ink pigment is not limited to these pigments.

As examples of a pigment of magenta ink, there are C. I. Pigment Red −5, −7, −12, −48, −48:1, −57, −112, −122, −123, −146, −168, −184, −202 and the like. However, the magenta ink pigment is not limited to these pigments.

As examples of a pigment of yellow ink, there are C. I. Pigment Yellow −1, −2, −3, −12, −13, −14, −16, −17, −73, −74, −75, −83, −93, −95, −97, −98, −114, −128, −129, −138, −151, −154 and the like. However, the yellow ink pigment is not limited to these pigments.

Further, as the colorant of each color, a so-called capsule dye/pigment in which the colorant is capsulated by resin may be used.

In order to obtain a good image, it is particularly preferable to use in combination: a black ink which uses carbon black having an anionic dye or an anionic surface group as the colorant, and color inks including polyvalent metallic ions of total concentration of 500 ppm or more. In this case, by using the black ink and the color ink together in a black ink image portion, the image density improves, and inter-color bleeding in the adjoining portion of a black image and a color image is suppressed, so that image quality improves.

Water-soluble Organic Solvent

The printing liquid includes, in addition to the above components, water as a solvent, and further may include a water-soluble organic solvent. In a case where the water-soluble organic solvent is added to the printing liquid, moisture keeping properties of the ink and the treatment liquid, and solubility of the colorant in the ink become better, and it is possible to prevent clogging, and maintain ejection stability when the printing liquid is ejected from the recording head. Further, in long-term preservation of the printing liquid, flocculation/precipitation of a treatment agent included in the colorant and the treatment liquid can also be prevented.

As specific examples of the water-soluble organic solvent, there are, as polyhydric alcohols, ethylene glycol, diethylene glycol, propylene glycol, butylene glycol, triethylene glycol, 1,5-pentanediol, 1,2,6-hexanetriol, glycerin, and the like.

As examples of glycol ether, there are polyhydric alcohol derivatives such as ethylene glycol monomethyl ether, ethylene glycol monoethyl ether, ethylene glycol monobuthyl ether, diethylene glycol monomethyl ether, diethylene glycol monoethyl ether, diethylene glycol monobuthyl ether, propylene glycol monobuthyl ether, dipropylene glycol monobuthyl ether, and an ethylene oxide adduct of diglycerin.

As examples of a nitrogen-containing solvent, there are pyrrolidone, N-methyl-2-pyrrolidone, cyclohexylpyrrolidone, triethanolamine, and the like.

As examples of a sulfur-containing solvent, there are thiodiethanol, thiodiglycerol, sulfolane, and dimethyl sulfoxide. Further, solvent such as propylene carbonate or ethylene carbonate can also be used together. Alcohols such as ethanol, isopropyl alcohol, butyl alcohol, and benzyl alcohol can also be used. Content of the water-soluble organic solvent is 1 to 60 parts by mass, and preferably 5 to 40 parts by mass.

Surfactant

Further, a surfactant may be added to the printing liquid. As the surfactant, a compound having a structure in which the molecule includes both of a hydrophilic part and a hydrophobic part can be used, and any of an anionic surfactant, a cationic surfactant, an amphoteric surfactant, and a nonionic surfactant may be used.

As the anionic surfactant, alkylbenzene sulfonates, alkylphenyl sulfonates, alkylphenyl naphthalene sulfonates, higher fatty acid salt, ester sulfates of higher fatty acid ester, sulfonates of higher fatty acid ester, ester sulfates and sulfonates of higher alcohol ether, higher alkylsulfo succinates, higher alkyl phosphoric ester salt, phosphoric ester salt of higher alcohol ethylene oxide adduct and the like can be used. For example, dodecylbenzene sulfonates, isopropyl naphthalene sulfonates, monobutyl phenylphenol monosulfonates, monobutyl biphenyl sulfonates, and dibutyl phenylphenol disulfonates are also effectively used.

As examples of the nonionic surfactant, there are polypropylene glycol ethylene oxide adduct, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, an oxyethylene adduct of acetylene glycol, aliphatic alkanolamide, glycerin ester, sorbitan ester, and the like.

As examples of the cationic surfactant, there are tetraalkyl ammonium salt, alkylamine salt, benzalkonium salt, alkyl pyridium salt, imidazolium salt, and the like. For example, there are dihydroxyethyl stearylamine, 2-heptadecenyl-hydroxyethyl imidazoline, lauryl dimetylbenzyl ammonium chloride, cetyl pyridium chloride, and stearamide, methylpyridium chloride.

In addition, a silicon surfactant such as polysiloxane oxyethylene adduct, perfluoroalkyl carboxylates, perfluoroalkyl sulfonates, a fluoric surfactant such as oxyethylene perfluoroalkyl ether, a biosurfactant such as spiculisporic acid, rhamnolipid and lyzolecithin can also be used.

It is preferable that the quantity of the surfactant added to the printing liquid is smaller than 10 parts by mass. In a case where the added quantity is 10 parts or more by mass, there is a possibility that the optical density and storage stability of the printing liquid may deteriorate.

Other Additives

For the purpose of property control such as improvement in printing liquid ejection property, polyethyleneimine, polyamines, polyvinyl pyrrolidone, polyethylene glycol, ethylcellulose, a cellulose derivative such as carboxymethyl cellulose, polysaccharides and their derivatives, other water-soluble polymers, polymer emulsions such as acrylpolymer emulsion and polyurethane emulsion, cyclodextrin, macrocyclic amines, a dendrimer, crown ethers, urea and its derivative, and acetamide can be used.

Further, in order to control electric conductivity and pH, alkaline metal compounds such as potassium hydroxide, sodium hydroxide and lithium hydroxide, and nitrogen-containing compounds such as ammonium hydroxide, triethanolamine, diethanolamine, ethanolamine and 2-amino-2-methyl-1-propanol can be used.

Further, an antioxidant, a fungicide, a viscosity controlling agent, an electroconductive agent, and an ultraviolet absorbent can also be added to the printing liquid, as necessary.

Among the components constituting the above-mentioned printing liquid, one of the main components corresponding to the volatile organic compounds is a low-molecular weight organic compound such as a water-soluble organic solvent. Besides this, in the case of an organic compound having a molecule-weight distribution such as a photopolymerizable compound, its low-molecular weight component also corresponds to the volatile organic compound.

For the printing liquid used in the invention, it is preferable that a water-soluble organic solvent having vapor pressure at 20° C. of $6.67\times10^{-2}$ kPa (0.5 mmHg) or less (hereinafter referred to as a low volatile organic solvent) is used, and it is more preferable that the vapor pressure is $1.33\times10^{-2}$ kPa (0.1 mmHg) or less. In a case where the vapor pressure of the water-soluble organic solvent included in the printing liquid is more than $6.67\times10^{-2}$ kPa (0.5 mmHg), the volatizing speed and diffusion speed of the water-soluble organic solvent in image formation become high. Therefore, there is a possibility that the water-soluble organic solvent cannot be decomposed sufficiently.

Accordingly, in a case where the water-soluble organic solvent is used for the printing liquid, it is preferable that the content of the low volatile organic solvent relative to the whole weight of the water-soluble organic solvent is 70% by weight or more, more preferable that it is 90% by weight or more, and most preferable that it is 100% by weight.

EXAMPLES

Although the invention will be described below with reference to Examples, it is not limited to the following Examples.

Example 1

Ink Jet Recording Apparatus

As an ink jet recording apparatus, an ink jet recording apparatus manufactured as an experiment, of which main parts have the structure shown in FIG. 1, is used.

An ink curing light source incorporated in this ink jet recording apparatus is an ultraviolet light source (UV-LED, wavelength 380±5 nm, 870 mW), and the light is radiated not only on a recording medium conveyed in the apparatus but also on a filter attached to a ventilation opening.

Further, the filter (an average size of a mesh is about 50 μm) provided for the ventilation opening of 50 mm×100 mm size is coated with a photocatalyst.

Photocatalyst (Support)

As the photocatalyst, an ultraviolet-light responsive photocatalyst, titanium dioxide having average primary particle size of 8 nm (anatase crystal type) is used.

Coating on the filter is executed by immersing the filter in an aqueous solution in which the photocatalyst (3% weight) is dispersed.

Printing Liquid

As the printing liquid, only black ink composed of the following components is used.

Carbon black: 10% by weight
Dispersant (polyesterate amideamine salt): 5% by weight
2-hydroxy-3-phenoxypropylacrylate: 15% by weight
Polyurethane acrylate: 5% by weight
Propylene glycol monomethoxyacetate (vapor pressure at 20° C.: 0.5 kPa (3.75 mmHg)): 35% by weight
Butylacrylate(vapor pressure at 20° C.: 0.44 kPa (3.30 mmHg)): 10% by weight
Methyl ethyl ketone (vapor pressure at 20° C.: 10.5 kPa (78.8 mmHg)): 15% by weight
Photopolymerization initiator (2-hydroxy-2-methyl-1-phenylpropane-1-on): 5% by weight Evaluation The ink jet recording apparatus is set in a test room (volume: 50 $m^3$, temperature: 24° C., humidity: 52%) which has been ventilated sufficiently in advance and in which an air-condition is switched off and a door is shut. The volatile organic compound concentration in the test room before a test, when air in the test room sampled by a scavenger is measured by the use of a GS-MS (gas chromatographic mass spectrometer), is not more than a detection limit value (1 $ng/m^3$).

Next, a black ink tank of a recording head is filled with the above printing liquid, paper of A4-size (210×297 mm) (Paper P by Fuji Xerox Co., Ltd.) is used as recording paper, and character images of black color are printed continuously for two hours at a rate of 10 sheets per minute.

When the volatile organic compound concentration in the test room after the test is measured again, it is 0.07 $mg/m^3$.

Comparative Example 1

Using the ink jet recording apparatus similar to that in Example 1 except that the filter is not coated with the photocatalyst, a similar test to that in Example 1 is executed. The volatile organic compound concentration in the test room before the test is not more than a detection limit value (1 $ng/m^3$).

When the volatile organic compound concentration in the test room after the test is measured again, it is 7.2 $mg/M^3$. It is found from this result that the volatile organic compound concentration is 100 times larger than that in Example 1.

Example 2

Ink Jet Recording Apparatus

As an ink jet recording apparatus, an ink jet recording apparatus (to which a housing is attached) manufactured as an experiment, of which main parts have a structure shown in FIG. 2, is used.

The housing is rectangular in section and uses a transparent resin plate (polycarbonate), in which the size of an opening part is 380 mm×100 mm, and the length is 500 mm. Further, the inner surface of this transparent housing is spray-coated with a photocatalyst.

Photocatalyst (Support)

As the photocatalyst, a visible light responsive photocatalyst, titanium dioxide (nitrogen-doped type anatase microcrystal obtained by heating under an ammonia/argon atmosphere) having particle size of 7 nm is used.

Coating on the inner surface of the transparent housing is executed by sufficiently spray-coating the entire transparent housing inner surface with aqueous solution in which the photocatalyst (1% by weight) is dispersed, and thereafter drying the entire housing inner surface.

Printing Liquid

As the printing liquid, the following four inks are used.

Black Ink

Carbon black (self-disperse type pigment): 5% by weight

Diethylene glycol (vapor pressure at 20° C.: $1\times10^{-4}$ kPa ($7.5\times10^{-4}$ mmHg)): 15% by weight Oxyethylene alkyl ether: 0.3% by weight Water: 79.7% by weight Cyan Ink Direct Blue 199: 3% by weight Diethylene glycol monobutylether (vapor pressure at 20° C.: $3\times10^{-3}$ kPa ($2.25\times10^{-2}$ mmHg)): 5% by weight Glycerin (vapor pressure at 20° C.: $7\times10^{-7}$ kPa ($5.25\times10^{-6}$ mmHg)): 10% by weight Sulfolane (vapor pressure at 20° C.: $6\times10^{-4}$ kPa ($4.5\times10^{-3}$ mmHg)): 10% by weight Oxyethylene oxypropylene block copolymer: 0.2% by weight Water: 71.8% by weight Magenta Ink Direct Red 75: 2% by weight Diethylene glycol monobutylether (vapor pressure at 20° C.: $3\times10^{-3}$ kPa ($2.25\times10^{-2}$ mmHg)): 5% by weight Glycerin (vapor pressure at 20° C.: $7\times10^{-7}$ kPa ($5.25\times10^{-6}$ mmHg)): 10% by weight Sulfolane (vapor pressure at 20° C.: $6\times10^{-4}$ kPa ($4.5\times10^{-3}$ mmHg)): 10% by weight Oxyethylene oxypropylene block copolymer: 0.2% by weight Water: 72.8% by weight Yellow Ink Direct Yellow 132: 3% by weight Diethylene glycol monobutylether (vapor pressure at 20° C.: $3\times10^{-3}$ kPa ($2.25\times10^{-2}$ mmHg)): 5% by weight Glycerin (vapor pressure at 20° C.: $7\times10^{-7}$ kPa ($5.25\times10^{-6}$ mmHg)): 10% by weight Sulfolane (vapor pressure at 20° C.: $6\times10^{-4}$ kPa ($4.5\times10^{-3}$ mmHg)): 10% by weight Oxyethylene oxypropylene block copolymer: 0.2% by weight Water: 71.8% by weight Evaluation The ink jet recording apparatus is set in a position which is approximately 1 m just under a fluorescent lamp in a test room (volume: 50 $m^3$, temperature: 23° C., humidity: 48%, setting of 20 fluorescent lamps of 40 W on the ceiling) which has been ventilated sufficiently in advance and in which an air-condition is switched off and a door is shut. The volatile organic compound concentration in the test room before the test is measured in a similar manner as in Example 1. The volatile organic compound concentration before the test is not more than a detection limit value (1 $ng/m^3$).

Next, four ink tanks of a recording head are filled with the above four printing liquids, paper of A4-size (210×297 mm) (Paper P by Fuji Xerox Co., Ltd.) is used as recording paper, and a full-color image is printed continuously for two hours at a rate of 6 sheets per minute. During the test, in order to activate the photocatalyst, all the fluorescence lamps in the test room are kept on an ON-state.

When the volatile organic compound concentration in the test room after this test is measured again, it is not more than a detection limit value (1 $ng/m^3$).

Comparative Example 2

Using the ink jet recording apparatus similar to that in Example 2 except that the housing inner surface is not coated with the photocatalyst, a test similar to that in Example 2 is executed. The volatile organic compound concentration in the test room before the test is not more than a detection limit value (1 $ng/m^3$).

When the volatile organic compound concentration in the test room after the test is measured again, it is 0.1 $mg/m^3$.

As described above, according to the invention, it is possible to provide the ink jet recording apparatus which can decompose the VOC components generated with the image formation, and thereby can suppress the volatile organic compound concentration in the space where the ink jet recording apparatus is set.

What is claimed is:

1. An ink jet recording apparatus comprising:

a recording head, the ink jet recording apparatus forming an image by ejecting printing liquid including a volatile organic compound (VOC) from the recording head onto a recording medium, a volatile organic compound decomposer for decomposing the volatile organic compound, the volatile organic compound decomposer comprising a catalyst that is a photocatalyst; and a photocatalyst activating light source for activating the photocatalyst;

the printing liquid including a light curable component which is cured by application of light, and the recording apparatus including an ink curing light source which irradiates a surface of the recording medium onto which the printing liquid is applied with light for curing the light curable component;

wherein the ink curing light source is also the photocatalyst activating light source.

2. The ink jet recording apparatus according to claim 1, wherein the photocatalyst is activated by application of at least one of visible light and ultraviolet light.

3. The ink jet recording apparatus according to claim 1, wherein the photocatalyst is titanium dioxide ($TiO_2$).

4. The ink jet recording apparatus according to claim 1, wherein the photocatalyst is supported by an adsorbent.

5. The ink jet recording apparatus according to claim 1, wherein the photocatalyst is supported by a resin material via an inorganic material.

6. The ink jet recording apparatus according to claim 1, which comprises a housing and a ventilation opening from which the inside of the housing is ventilated, the ventilation opening having a filter, wherein the filter is coated with the photocatalyst.

7. The ink jet recording apparatus according to claim 1, which comprises a housing provided with a paper outlet from which the recording medium is discharged, and a paper discharge tray on which the recording medium discharged from a paper discharging opening part is stored, wherein at least one of an outer surface of the housing and a surface of the paper discharge tray is coated with the photocatalyst.

8. The ink jet recording apparatus according to claim 1, which comprises a housing provided with a paper outlet from which the recording medium is discharged, and a paper discharge tray on which the recording medium discharged from a paper discharging opening part is stored, wherein between the housing and the paper discharge tray, a transparent housing having one opening connected to the paper outlet and the other opening connected to the paper discharge tray is provided; and the inner surface of the transparent housing is coated with the photocatalyst.

9. The ink jet recording apparatus according to claim 1, wherein the maximum image forming speed in a case where the recording medium is of A4 size (210×297 mm) is 10 sheets per minute.

10. The ink jet recording apparatus according to claim 9, wherein the maximum image forming speed is 100 sheets per minute.

11. The ink jet recording apparatus according to claim 1, wherein the image formation is performed, in a state where the recording head is fixed, by conveying the recording medium in one direction so that the recording medium faces a surface of the recording head on the side from which the printing liquid is ejected; and the width of the recording medium in the direction orthogonal to the conveying direction of the recording medium is generally the same as the width of the recording head in the direction orthogonal to the conveying direction of the recording medium.

12. The ink jet recording apparatus according to claim 1, wherein the printing liquid includes a photopolymerizable compound.

13. The ink jet recording apparatus according to claim 12, wherein the printing liquid includes a photopolymerization initiator.

14. The ink jet recording apparatus according to claim 1, wherein ink including a colorant, and colorless or light-colored liquid (treatment liquid) that does not include a colorant are used as the printing liquid.

15. The ink jet recording apparatus according to claim 14, wherein the treatment liquid includes a photopolymerization initiator.

* * * * *